United States Patent

Sawhill et al.

[11] Patent Number: 6,030,649
[45] Date of Patent: Feb. 29, 2000

[54] PROCESS FOR TREATING PRE-DRIED ANIMAL MEAL

[76] Inventors: James W. Sawhill, 1403 Rampart Dr., Roseville, Calif. 95661; Leon D. Freeman, 48 Alta Way, Madera, Calif. 94925

[21] Appl. No.: 09/199,828

[22] Filed: Nov. 25, 1998

[51] Int. Cl.[7] ............................... A23L 1/311; A23J 3/04; A23J 3/34
[52] U.S. Cl. ................... 426/56; 426/59; 426/657
[58] Field of Search ................... 426/55, 56, 32, 426/53, 574, 656, 657, 59; 514/21

[56] References Cited

U.S. PATENT DOCUMENTS

| | | | |
|---|---|---|---|
| 2,431,256 | 11/1947 | Keil et al. | 252/352 |
| 2,477,255 | 7/1949 | Keil et al. | 252/307 |
| 3,891,770 | 6/1975 | Sato et al. | 426/32 |
| 3,924,005 | 12/1975 | Bosund et al. | 426/7 |
| 4,473,589 | 9/1984 | Freeman et al. | 426/7 |
| 5,071,665 | 12/1991 | Buckley et al. | 426/272 |

*Primary Examiner*—Keith Hendricks
*Attorney, Agent, or Firm*—Flehr Hohbach Test Albritton & Herbert LLP; David J. Brezner

[57] ABSTRACT

A process for the treatment of pre-dried animal meal yields products containing small peptides, resulting from combining methods of alkaline liquification and proteolytic enzyme treatment. These peptides are highly suitable for inclusion in animal feeds or edible food products.

14 Claims, No Drawings

PROCESS FOR TREATING PRE-DRIED ANIMAL MEAL

BACKGROUND OF THE INVENTION

The present invention relates to the treatment of a dry animal meal to produce products consisting of small peptides. These peptides are highly suitable for inclusion in animal feeds or edible food products. These peptides result from combining a method of alkaline liquification and proteolytic enzyme treatment.

Keil, et al., U.S. Pat. Nos. 2,431,256 and 2,477,255 describe a protein hydrolysis under severe conditions of alkalinity and temperature which result in a degradation of the amino acid quality of the end products. Sato, et al., U.S. Pat. No. 3,891,770, describes a waste water treatment procedure in which protein and fat are concentrated with the assistance of polyacrylate precipitating agent to prepare a froth. The patent to Bosund, et al., U.S. Pat. No. 3,924,005, describes a totally enzymatic process for solubilizing fish proteins.

In U.S. Pat. No. 4,473,589, by the present inventors, an improved process is described in which sources of protein, such as by-product residues from processing fish, poultry, pork and beef, are hydrolyzed to produce liquid products. In this process, the starting materials were the raw waste products which were heated in an aqueous slurry at an initial pH of at least 12 and at an elevated temperature of about 120°–170° F. for a time sufficient to rupture the cells and to liquefy the proteins. This treatment provides the means to pasteurize or sterilize the product, which markedly improves product quality. This involves the judicious use of both time, and temperature for the alkaline step with a pH of at least 12. The proteins were treated by enzymatic digestion at a temperature of about 100°–140° F. at an alkaline pH in the presence of an effective amount of a proteolytic enzyme. The end liquid product was a liquid containing both peptones and smaller polypeptides.

The process of U.S. Pat. No. 4,473,589 produces a good feed supplement or fertilizer. However, it relies on a source of fresh or raw undenatured protein material (e.g. offal) which is not always available throughout the year. Also, such sources are subject to wide variations in composition leading to difficulties in controlling the uniformity of the end product. Also, the raw materials tend to spoil quickly, generally requiring the liquefication processing plant to be near the raw material source. Also, the process is not optimally effective for offal of all animals. Further, fat in the offal remains in the final product which is undesirable for many potential end uses.

Thus, there is a need for a new improved process to convert animal byproducts into useful end products.

SUMMARY OF THE INVENTION

In accordance with the present invention, a method is provided for using a pre-dried animal meal containing denatured protein to make a product useful for animal feed, edible food products, or other uses. The method includes the steps of:

(a) contacting the pre-dried meal with an aqueous solution to form an aqueous dispersion of said meal at pH in excess of about 12, (b) maintaining the dispersion at a temperature in excess of about 150° F. for sufficient time to substantially liquefy the animal meal, and (c) incubating the liquefied animal meal dispersion and an effective amount of one or more proteolytic enzyme under conditions to hydrolyze the liquefied meal to a more soluble product.

In one embodiment, prior to step (a) the dried animal meal is washed with hot water to extract fats and water-soluble materials from the meal, and then most of the wash water is removed.

DETAILED DESCRIPTION OF PREFERRED EMBODIMENTS

In the present invention the source or starting material is a pre-dried animal meal (e.g. from offal). Typically, all of the protein is denatured. Such meal is commercially available from a conventional rendering process.

In one process ground wet animal (e.g. meat) tissue is dried at temperatures over 210° F. in rotary drier at atmospheric pressure. The resulting dried product typically includes about half fat and half meat meal components. The mixture is either centrifuged or pressed to remove most of the fat. The resulting meat meal usually contains no more than about 5–8% fat. These meat meals can be derived from any meat source such as beef, pork, lamb, poultry or fish. Such products are sold under the name fish meal, fish by-product meal, meat meal, meat and bone meal, poultry by product meal, blood meal, feather meal, fish solubles.

The term "pre-dried animal meal" also includes pre-dried fish meal, poultry meal, feather meal, blood or any other meal made from an animal source. All of these meat meals are commercially available and are described in THE FEED INDUSTRY RED BOOK, REFERENCE & BUYERS GUIDE, 1998 ("the Guide"). The Guide is published and updated every year and completely describes each of the meat meals with other data such as amino acid content, percent of calcium and phosphorous. The Guide also includes the acceptable proximate analysis of the different meat meal e.g. % protein, fat, ash, and moisture.

The above animal meals typically have compositions (by weight) as follows: protein content about 50 to 70%, ash about 10 to 15%, fat 5 to 15%, moisture less than 6%. The protein typically is totally denatured, completely insoluble in water and has not been split up into polypeptides.

A typical meat meal has a composition including 50% protein, about 5 to 15% fat, and about 15 to 25% ash, fish meal typically has a composition of about 50 to 70% protein, about 6% fat, and about 10 to 20% ash, while a blood meal typically has a composition of about 80 to 90% protein, no fat, and a small amount of ash. A feather meal typically has a composition of about 80 to 90% protein, about 5 to 10% fat, and about 2 to 4% ash. Sources of the various meals are as follows:

Pork pre-dried animal meal is derived from pork offal.

Beef source pre-dried animal meals are typically derived from beef tissues, including beef offal such as beef intestines, or other waste products derived from the slaughter of beef. Beef designated as 3D or 4D in the meat packing industry are also used.

Fish source pre-dried fish meal is typically derived from either whole small fish or from fish offal. Whole fish meals are called fish meals, when the source is fish offal the meal is called fish by product meal. Fish solubles are the condensed water from the heat treated fish before canning.

Poultry byproduct meal is a rendered product that contains poultry waste of all types, including blood, internal organs, beaks, heads, and feet, whole birds (DOA's ).

Dried animal meal from animal blood, or feathers or other protein sources may also be employed. All commercially available meat meals contain the name of the source and the notation whether the meal is either by product meal or is from a non by-product source.

In the present process, in a "liquefying" step, pre-dried animal meal containing denatured protein is contacted in a mild alkaline hydrolysis step with an aqueous alkaline solution to form a dispersion of the meal at a pH in excess of about 12. The dispersion is maintained at a temperature in excess of about 150° F. for sufficient time to substantially liquefy the animal meal. Thereafter, the dispersion and an effective amount of a proteolytic enzyme is incubated under conditions to hydrolyze the liquefied meal to a more soluble product.

Prior to the above process, the animal meal is optionally washed in hot water to extract fats and water soluble materials from the meal. Then, at least part and preferably most of the wash water is drained and the meal is contacted with the high pH aqueous solution in the alkaline hydrolysis step. In this instance, the meal has been wetted prior to contacting with the high pH solution. However, as used herein, the term "pre-dried meal" refers to an animal meal which has been pre-dried as set forth above, and which thereafter can be treated by washing or other optional steps prior to contact with the alkaline solution.

During the washing step, a substantial amount of the fat present in the pre-dried animal meal is removed in the wash water. The heat from the water causes the fat or gelatin to liquefy and become dispersed in the water. Similarly, soluble components such as soluble salts are dissolved in the water. A suitable minimum temperature to accomplish this is from about 100° F. to 160° F., preferably from about 120° F. to 140° F. The wash water preferably is used in excess of the meal, e.g. greater than about four times the volume of the meal, to as high as about six times the volume, or more.

The water in the washing step should be hot enough to melt tallow (for beef) i.e. greater than 120° to 130° F. However, the temperature can be as high as 212° or more in a closed vessel.

The wash water containing these undesired components is separated or removed from the animal meal suitably by draining of part of, and preferably most of, the wash water. In this manner, the percentage protein in the final product is increased, a desirable characteristic for both animal feed and edible food end products typically in a powdered form.

In the liquefying step, the pre-dried animal meal is contacted with an aqueous alkaline solution of a strong base to form an aqueous dispersion of the meal at a pH in excess of about 12. Preferably the pH is in the range of 12.0 to 13.0 or higher, and more preferably between about 12.2 and 12.5. The amount of base required will vary depending upon the starting animal meal and the strength of the base. Using sodium hydroxide, the amount of base typically is at least 1% and more typically about 1.5 to 2.5% by weight to achieve the desired pH level. Similar amounts of other useful bases can be used such as potassium hydroxide and ammonium hydroxide, depending on the end use.

It is preferable that the dried animal meal be added to the hot solution (about 170° F. to 250° F.) incrementally typically at a rate of about 25% every five minutes. Otherwise, an insoluble gel can develop which is very difficult to mix or liquefy.

The alkaline dispersion preferably is maintained for sufficient time for liquefaction at the desired pH level at a temperature about 120° F. to 200° F. and preferably about 165°–180° F. or higher. The dispersion is preferably agitated during liquefication. In this step, the animal meal is substantially liquefied in the dispersion within 15 minutes.

During this step it is preferable to agitate the animal meal in the alkaline solution until the desired liquefication end point is reached. In one mode, the system is agitated until a viscosity of about 2500 cps to 1500 cps, (e.g. about 2,000 cps) measured at a pH of 12 and a temperature of 165° F. Thereafter, it is agitated for about 15 to 30 minutes, and preferably at least 30 minutes, at which point the viscosity typically drops to about 500 cps. A suitable minimum time after reaching the desired viscosity is about 15 minutes. However, it is preferable to maintain the mixture for at least 30 minutes to sterilize the product to a sufficient extent to inactivate pathogenic organisms such as bacteria, yeast, molds and viruses. After the first step, the proteins are typically converted to peptone form with a chain length on the order of 50 to 100 amino acids.

In the mild alkaline liquefying step, the animal meal becomes more susceptible to subsequent enzyme hydrolysis. This is accomplished in part by causing cell rupture which permits more rapid enzyme breakdown of intact proteins to smaller, more soluble molecules (peptides).

The time and temperature of the liquefying step are interdependent, that is, a higher temperature requires a shorter time. The desired endpoint of the liquefying step can be determined in a number of ways. For example, the viscosity of the dispersion is an indication that sufficient breakdown of the protein occurs in the liquefying step.

By "liquefying", it is meant that the protein is suspended or dissolved and at least partially unfolded to form a smooth-flowing aqueous dispersion so that the animal meal is no longer a discrete powder.

In the next step, enzymatic digestion, a proteolytic enzyme is added to hydrolyze the protein from the alkaline hydrolysis step. Since the animal meal from the prior step is highly alkaline, it is preferable to use an enzyme which is also effective (i.e. enzymatically active) at alkaline conditions to avoid the necessity of a significant pH adjustment. Thus, high alkaline, alkaline and neutral proteases may be employed with the degree of lowering of the pH being selected to provide good enzymatic hydrolysis of the protein. Most industrially available enzymes require a lowering of the pH level to below 12.0 for optimum use of the enzymes. The pH level may be adjusted by adding an appropriate amount of a pH lowering agent such as a strong acid (e.g., sulfuric acid, phosphoric acid, acetic acid, nitric acid or hydrochloric acid).

An enzyme supplied by Genencor International, Inc. under the name of Multifect P-3000 is effective at a pH of about 8 to 11 and has optimum temperatures of 125 to 145° F. Other suitable enzymes include Alcalase 2.4L sold by Novo which is effective at the same pH and temperature.

As the enzyme hydrolysis proceeds, carboxylic groups of the protein are liberated thereby lowering the pH level slightly (e.g. up to 0.5 to 1.5 pH units). Thus, depending on the pH level at the time of adding the enzyme and the effective pH range of the enzyme, an alkaline protease can be added at the end of the first stage at the pH existing in the slurry, preferably after adjusting the pH. The enzymatic step should start with a high alkaline pH protease when the pH is brought down to the high end of its effective range. To achieve the most complete enzymatic hydrolysis, more that one enzyme can be used by adjusting the pH so that both enzymes are still in their known range of effectiveness. The alkaline protease would be followed by a low alkaline protease and if needed by a neutral protease. The choice would be based upon the starting meal and the desired peptide size of the product.

A high alkaline protease generally is most effective at a pH of about 9–11; a low alkaline or alkaline protease is generally most effective at a pH of about 8–10; and a neutral protease is generally most effective at a pH of about 6–8.

The amount of enzyme utilized is that necessary and effective to complete the hydrolysis to provide the desired peptide size. The amount of enzyme will vary, depending on the concentration of enzyme in its formulation and the method of manufacture of enzyme. Usually the amount of enzyme, as it is formulated by the manufacturer and used in the enzyme hydrolysis step will be about 0.05% to 0.2% weight percent of the weight of the starting material.

The enzyme incubation time is sufficient to digest the hydrolysate from the mild alkaline hydrolysis step to a more soluble product with considerably more peptides present. This high peptide containing solution will have a low viscosity when concentrated to 50% solids. It is believed that the low viscosity solution of peptides can be divided into three main parts. The low molecular weight portion will comprise about 40% of the total solids, the middle group will also contain about 40% and will range from 10 to 30 amino acids. The last group will vary in size from 30 to 125 amino acids in length. Suitable enzymatic digestion time to accomplish this is typically 8 hours to overnight (18 hours). The relative size of the three classes of peptides can be changed by adding additional enzymes and enzymatic digesting time. For example a digestion with Flavorzyme® peptidase enzyme at a pH of 7 at 125° F. for 24 hours will increase the amount of peptides in both of the smaller sized peptide groups.

The temperature of the enzymatic incubation is dictated by the stability of the enzyme. A typical enzyme is more stable at a lower temperature than the desired liquefication temperature. Thus, it is preferable to cool the mixture prior to the addition of the enzyme. However, if an enzyme can be found that is stable at the higher temperature, this step is not necessary. A mixture of enzymes supplied by Novo Nordisk under the name Flavorzyme is effective at a pH of 6–7 and 125° F.

To determine the desired peptide length in the end product of digestion, the viscosity can be translated into HPLC data through charts that compensate for temperature and percent solids. For example, at the end of the digestion period a sample is concentrated to 50% solids and the 2,000 cps viscosity is checked against temperature. Typically, this viscosity is directly related to the size of the peptides present in the 50% solids mixture.

Average peptide size is the number of amino acids in that peptide chain which at the peak of the distribution curve for a given fraction as obtained by HPLC. The distribution curve is not symmetrical. Since the peptides arise from long proteins, after hydrolysis there will be many peptides which contain more amino acids than the peptide at the peak which is referred to as the average peptide size. These can include peptide chains up to more than 30 amino acids. This means that in the following chart, the peak only is shown. For example, when the average peptide size is 9, this is the length of the peak molecule and the range can be from about a 5 amino acid chain length to above 30 amino acid peptides.

The average peptide size can be estimated in the final liquid product by using the flowability of a 50% concentrate at different temperatures. Flowable means that the concentrated liquid (usually 50% total solids) has a viscosity of 1000 to 2000 cps at a temperature that is specified. This provides an estimate of the peptide chain lengths in a given batch of product. The higher the temperature needed to achieve a flowable state means the average chain length is long and the product is not well digested. A desirable goal is to get a flowable product at an ambient temperature.

If the concentrate is flowable at a temperature of 200–220° F., the average peptide chain length is about 11 amino acids. If the flowable temperature is 150–180° F., the average peptide length is 9 amino acids, if 100–120° F., it is 7 amino acids, if 70–90° F., it is 5 amino acids and if 40° F., it is 3–5 amino acids. These amino acid chain lengths were checked against the available HPLC data.

The value of comparing viscosity data with HPLC data estimates the size of the peptide is to develop a method that can be used for process control during the manufacturing process HPLC. Other methods of estimating molecular weight are too slow to be used as process control procedures.

Optionally, an antioxidant such as bisulfite can be added in the alkaline liquefication step to prevent disruption of the sulphur—sulphur bonded cystine during this step. During enzymatic hydrolysis, the bisulfite is oxidized to sulphate.

It has been found that bacteriological stability at 70° F. can be achieved by concentrating the more soluble product of enzymatic digestion to no greater than 60% preferably no greater than 50%. The product of the enzymatic hydrolysis step can also be dried to a fine powder by well known drying techniques such as spray drying or the like.

The end product can be used for making both edible and inedible milk replacement products for the very young. These peptides can be used to replacer protein in the milk replacer. The end product typically has a protein content of about 20% a fat content of 20% and a sugar content of 50%. The remainder is calcium phosphate. A substantial portion (e.g. 40 to 70% by weight) of the protein in a conventional milk replacer can be substituted for with a peptide mixture and usually results in a feed or food that is acceptable to the animal and increases both consumption but also growth rates and feed conversions.

The following examples illustrate specific embodiments of the present invention.

EXAMPLE 1

The processing of 100 grams of meat meal is carried out as follows: The 100 grams of meat meal is added with agitation to the 2% caustic solution at 165 degrees, in increments over a 15 minute time period. When the viscosity has lowered to 2,000 cps, the agitation is continued and the temperature maintained for an additional 30 minutes to eliminate bacterial presence. The fluid mix is cooled to 125° F., the pH adjusted to 9.5 with phosphoric acid and 0.1% Alcalase enzyme 2.41 added. The enzymatic digestion takes place over night at 125° F. The batch is neutralized to a pH of 7, the undissolved portion removed by screening (maximum of 5% by weight) and the mix is deodorized and concentrated to 50% solids. The mix is cooled to below 70° and stored until it is sent to the drier in which it is dried to a water content of less than 4–5%.

EXAMPLE 2

Removal of Fat and Soluble Ash from Rendered Meal

Experimental Procedure

1. Two samples, one of commercial blood meal and one of a commercial sample of feather meal (250 gms each) were washed with three volumes (750 mls) of hot (150° F.) water three times. Both of the dry meals entrapped about an equal weight of water during the processing. The three washes from each sample were combined.

2. The combined filtrates were concentrated to 100 ml by atmospheric evaporation. The 100 ml concentrate was assayed for percent solids, fat, protein and ash.

3. Performed a reverse order digestion on each of the washed cakes.

4. These cakes are used in the process.

Results

TABLE #1

Proximate analysis on Different Fractions

| Ingredient | % Protein | % water |
| --- | --- | --- |
| 1. Starting Blood Meal | 85% | 6% |
| Washed Blood Meal | 98% | 0% |
| 2. Starting Feather Meal | 80% | 6% |
| Washed Feather Meal | 96% | 0% |

TABLE #2

Analysis of Hot Water Washes

| Ingredient | % Starting Material | % Protein | % Fat | % Ash |
| --- | --- | --- | --- | --- |
| Blood Wash | 5% | negligible | 2% | 3% |
| Feather Wash | 12% | 4% | 4% | 4% |

1. A prewash of commercial blood meal and commercial feather meal will increase the percent protein content.

2. The washed products will entrap about an equivalent weight of water in the cake.

3. This washed cake will make a liquid by the two step liquefaction procedure for a denatured protein meal.

4. The loss of protein in the feather wash is fairly small (4% out of 80%). The loss is the protein fraction (gelatin). Gelatine is nutritionally inferior in amino acid quality to most available meat meals.

EXAMPLE 3

Correlation of HPLC Data and Viscosity Data and Peptide Size

HPLC standard curves for peptide molecular weight were developed in the specific laboratory conducting these studies using three known proteins, a known peptide and a Vitamin B 12 with a known molecular weight. These calibrations indicated that a nine amino acid peptide is eluted in 21 minutes, a 7 amino acid peptide in 24 minutes, a 5 amino acid peptide is eluded at 27 minutes and a 3 amino acid peptide at 29 minutes.

Several samples of product of the process representing different degrees of enzymatic hydrolysis were run and the eluate came of the column between 19 and 32 minutes. Each of the preparation tested had a different molecular weight distribution.

About 40% of the eluate was rapidly eluded. These would include the large peptides. About 30% were eluted close to the peak or immediately following the peak and this would have had peptides which were estimated to have a range of sizes from larger than 9 amino acids to 6–7 amino acids and the balance came off the column in the last material to be eluded and were estimated to be 2–5 amino acids in length. These estimates were made from the elution times.

Viscosity. By changing the conditions of the enzymatic digestion such as substrate concentration level and type of enzyme, digestion time, and temperature, peptides in the low molecular weight range can be increased at the expense of the larger molecules. As the digestion proceeds towards completion, the viscosity is reduced. If the digest is concentrated to 50% solids, will be flowable (2000 cps) at different temperatures depending upon the average peptide size in the preparation.

TABLE #3

Flowable 50% Solids Peptide Solutions
Versus Temperature and Peptide Size
Final Viscosity of 1,000 To 2,000 CPS

| Average Peptide Size | Temperature to be Flowable |
| --- | --- |
| 11 Amino Acids | 200 to 220° F. |
| 9 Amino Acids | 150 to 180° F. |
| 7 Amino Acids | 100 to 120° F. |
| 5 Amino Acids | 70 to 90° F. |
| 3–5 Amino Acids | 40° F. |

Experiments indicate peptides can increase growth rates and feed conversions in very young pigs. There is also indications that peptide size may also play a role in the very young pig's growth response to peptides.

EXAMPLE 4

Producing a Meat and Bone Meal and Removing the Bones from the Resulting Peptide Solution Utilizing a commercial sample of meat and bone meal from a rendering company a preparation of a peptide digest was performed. The purpose of this experiment is to eliminate the entrapped fat, gelatin and soluble ash with a hot water wash and then liquefy the remaining denatured meat proteins to peptides and screening the bone fragments from the soluble peptide fraction.

Wash Step 300 gms of the rendered meat and bone meal was washed with several volumes of 140 degree water. One liter of water in three increments. collected the combined washes and concentrated the washes to 50 mls and analyzed the 50 mls for fat, protein and ash.

Processing Procedure 1. 270 mls of water and 30 mls of 50% sodium hydroxide were combined and warmed to 160° F. with agitation.

2. 500 gms of washed wet cake was added incrementally over a brief period of time (15 minutes) with agitation. When the mix passed the spoon test (viscosity of less then 2,000 cps), the alkaline step was continued for an additional 30 minutes at 160° F. and with agitation.

3. The mix was cooled, pH adjusted to 8.5 and 1 ml of Alkalase 2.4L was added. When the temperature of the neutralized alkaline hydrolysis reached 125° F., 16 hours of enzymatic digestion was performed.

4. The enzymatically digested beef peptide mix was screened through both a 16 mesh and a 25 mesh screen. The bones fragments were collected, dried and weighed.

5. The digest was collected, weighted and solids run on the liquid portion.

6. The digest was concentrated down in order to achieve a temporary preservation. The sample of the concentrate was sent to an outside laboratory for analysis.

| Yield of Solids in Different Fractions | | |
| --- | --- | --- |
| Description of Fraction | Weight | % of Total Weight |
| 1. Starting M & B meal 100% | 300 gms | |
| 2. Water Soluble fraction | 15 gms | 5% |
| 3. Bones | 160 gms | 53% |
| 4. Beef Digest (dry basis) | 125 gms | 40% |

| Proximate Analysis of Bone Fraction and Protein Fraction | | | | |
| --- | --- | --- | --- | --- |
| Fraction | Protein | Ash | Fat | Moisture |
| Bones | 12% | 85% | 2% | NONE |
| Digest (wet) | 30% | 4.6% | NONE | 46% |
| Dry | 60% | 9% | NONE | NONE |

Conclusions:

1. The procedure of a hot water wash, the two step digestion of the denatured protein, followed by screening results in a separation of the bones and peptides and the yields of peptides in the final peptide solution indicates a 60% solids level.

2. Viscosity Data indicates this particular experiment sample contains an average of about 9 amino acid peptides.

EXAMPLE 5

Three Temperature Stability of Peptones made from Beef and Feathers

The purpose of this experiment is to find at what concentration of peptides will achieve temporary bacteriostatic conditions of a peptide solution. A bacteriostatic condition is preferable to produce a good quality peptide solutions. These freshly prepared solutions of peptide could be stored for a short time period before drying.

Experimental

FEATHER PREP

1. A 30% peptone solution (80 mls) was prepared from commercially dried feather meal by the two step liquefaction. The resulting peptide solution was concentrated to 40% solids via atmospheric distillation. Four 150 ml samples were prepared from this 40% concentrate. The feathers assayed 90% protein on a 100% solids basis.

TABLE #1

| Percent Solids and Percent Peptides in Each of the Samples | |
| --- | --- |
| Percent Solids | Percent Peptones |
| 25% | 22.5% |
| 30% | 27% |
| 35% | 31.5% |
| 40% | 36% |

150 mls of each was put up for stability over a three week period. The Starting 40% solution had a count of 1500 bacteria per ml.

TABLE #2

| Bacteria Levels During Three Week Stability Study at 70 Degrees F. | | | | |
| --- | --- | --- | --- | --- |
| % Solids | % Peptides | 1 wk TPC | 2 wk TPC | 3 wk TPC |
| 25 | 23 | 50,000 | 150,000 | >300,000 |
| 30 | 27 | 35,000 | 125,000 | >300,000 |
| 35 | 32 | 2,000 | 1,000 | 4,000 |
| 40 | 36 | 1,000 | 500 | <100 |

Conclusions Based upon this Portion of the Experiment:

1. At 35% (32% peptides) bacteriostatic conditions were achieved when the solution was stored at 70% F.

Second Portion of Stability Study

Purpose: To evaluate a broad range of concentrations of a well digested beef digest prepared from a dried meal at three different temperatures (70, 100 and 125). The viscosity data indicates an average peptide length of 5 amino acids.

Procedure: Prepared a beef meal digest from a commercial beef meat meal. Screened out the bones and other residues. Concentrated to 50% solids and prepared the following samples from this concentrate.

1. Three 100 ml samples of 25%
2. Three 100 ml samples of 30%
3. Three 100 ml samples of 35%
4. Three 100 ml samples of 40%
5. One 100 ml sample of 45%
6. One 100 ml sample of 50%

The three samples of each dilution of 25 to 40 were placed on 70, 100 and 125 degree stability. The 45 and 50% samples were put on 70% degree stability.

TABLE #3

| Percent Solids and Percent Peptones in the Different Beef Peptide Plus Samples | |
| --- | --- |
| Percent Solids | Percent Peptones |
| 25% | 18% |
| 30% | 21% |
| 35% | 24% |
| 40% | 28% |
| 45% | 31% |
| 50% | 35% |

TABLE #4

| One Week 70 Degree Stability of Beef Peptones | | |
| --- | --- | --- |
| Percent Solids | Percent Peptides | Total Plate Count |
| 25 | 18 | >300,000/ml |
| 30 | 21 | >300,000/ml |
| 35 | 24 | >300,000/ml |
| 40 | 28 | 200,000/ml |
| 45 | 31 | 4,000/ml |
| 50 | 35 | <100 |

TABLE #5

Evaluation of the Beef Samples by the Smell Test
During First Week by Temperature of Storage

| Temperature of Storage | Percent Solids | Spoilage |
|---|---|---|
| 1. 100° F. | 25% | Yes |
|  | 30% | Yes |
|  | 35% | Yes |
|  | 40% | Yes |
| 2. 125° F. | 25% | Yes |
|  | 30% | Yes |
|  | 35% | Yes |
|  | 40% | Yes |
| 3. 70° F. | 25% | Yes |

Conclusions From the Beef Portion of this Experiment.

1. All the 125 and 100 degree samples spoiled rapidly. Some within one or two days.

2. At the end of seven days the two lower concentration beef samples stored at 708 degrees F. had started to smell.

3. Some of the 70 degree samples, even though they did not smell, had too high bacteria count.

What is claimed is:

1. A method for making animal feed or edible food products from pre-dried animal meal containing denatured protein, said method comprising:

(a) contacting said pre-dried meal with an aqueous solution to form an aqueous dispersion of said meal at a pH in excess of about 12, (b) maintaining said dispersion at a temperature in excess of about 150° F. for sufficient time to substantially liquefy said animal meal, and (c) incubating said liquefied dispersion and an effective amount of at least a first proteolytic enzyme under conditions to hydrolyze the liquefied meal to a more soluble product.

2. The method of claim 1 further comprising the following steps:

(d) prior to step (a), washing said dried animal meal with hot wash water to extract fats and water-soluble materials from the meal, and (e) removing at least some of the extract-containing wash water from the animal meal.

3. The method of claim 1 in which in step (b) the pH is reduced to a level at which said proteinase has effective activity.

4. The method of claim 3 in which during step (c) the pH level is no greater than about 11.

5. The method of claim 1 in which said more soluble product comprise peptides of an average size of about 3 to 25 amino acids in length.

6. The method of claim 5 in which the average peptide size is no greater than about 10 amino acids.

7. The method of claim 1 in which the meal in the dispersion at the completion of step (c) is at a concentration no greater than 35% solids, said method further comprising the step of:

(d) concentration said suspension to at least 50% solids.

8. The method of claim 1 further with the step of:

(d) drying said more soluble product of step (c).

9. The method of claim 1 in which said pre-dried animal meal comprises a meal from a source consisting of beef, pork, lamb, poultry, feathers, fish, blood, and mixtures thereof.

10. The method of claim 9 in which said animal meal comprises a mixture of at least two of said sources.

11. The method of claim 1 in which the viscosity of the aqueous dispersion at the time of enzyme addition in step (c) is no greater than 2500 cps.

12. The method of claim 1 in which the viscosity of the dispersion at the end of incubate in step (c) is no greater than about 2000 cps.

13. The method of claim 1 further comprising adding an antioxidant to said dispersion in step (a).

14. The method of claim 1 in which at least a second proteolytic enzyme is present in incubation step (c).

* * * * *